United States Patent
Maier et al.

(10) Patent No.: US 12,325,810 B2
(45) Date of Patent: Jun. 10, 2025

(54) WATER-BASED COMPOSITION WITH CHEMICAL CROSS-LINKING

(71) Applicant: SIKA TECHNOLOGY AG, Baar (CH)

(72) Inventors: Steffen Maier, Wettingen (CH); Nestor Failache, Buenos Aires (AR); Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 1083 days.

(21) Appl. No.: 17/053,164

(22) PCT Filed: Jul. 1, 2019

(86) PCT No.: PCT/EP2019/067528
§ 371 (c)(1),
(2) Date: Nov. 5, 2020

(87) PCT Pub. No.: WO2020/007765
PCT Pub. Date: Jan. 9, 2020

(65) Prior Publication Data
US 2021/0130665 A1    May 6, 2021

(30) Foreign Application Priority Data

Jul. 4, 2018 (EP) .................................... 18181732

(51) Int. Cl.
| | | |
|---|---|---|
| C09J 175/08 | (2006.01) | |
| C08G 18/08 | (2006.01) | |
| C08G 18/12 | (2006.01) | |
| C08G 18/32 | (2006.01) | |
| C08G 18/34 | (2006.01) | |
| C08G 18/48 | (2006.01) | |
| C08G 18/75 | (2006.01) | |
| C08G 18/76 | (2006.01) | |

(52) U.S. Cl.
CPC ........ *C09J 175/08* (2013.01); *C08G 18/0823* (2013.01); *C08G 18/12* (2013.01); *C08G 18/3256* (2013.01); *C08G 18/348* (2013.01); *C08G 18/4812* (2013.01); *C08G 18/4825* (2013.01); *C08G 18/4837* (2013.01); *C08G 18/755* (2013.01); *C08G 18/7621* (2013.01)

(58) Field of Classification Search
CPC ............ C08L 2205/02; C08L 75/04–10; C09J 175/04–10
See application file for complete search history.

(56) References Cited

U.S. PATENT DOCUMENTS

| | | | | |
|---|---|---|---|---|
| 5,334,690 A | * | 8/1994 | Schafheutle | ....... C08G 18/4676 528/71 |
| 5,552,496 A | * | 9/1996 | Vogt-Birnbrich | ...... C08G 18/10 252/182.28 |
| 5,807,919 A | * | 9/1998 | Duan | .................. C08G 18/4676 524/507 |
| 6,017,998 A | * | 1/2000 | Duan | .................. C08G 18/0819 524/591 |
| 2007/0129522 A1 | * | 6/2007 | Burckhardt | ............ C08G 18/12 528/44 |
| 2010/0255314 A1 | * | 10/2010 | Burckhardt | ........... C07C 251/08 156/331.7 |
| 2012/0077044 A1 | * | 3/2012 | Beyers | ................... C09J 175/06 427/407.1 |
| 2015/0152300 A1 | * | 6/2015 | Saitou | .................... C09J 163/00 525/123 |
| 2016/0304758 A1 | * | 10/2016 | Bai | .................... C08G 18/6674 |

FOREIGN PATENT DOCUMENTS

| | | |
|---|---|---|
| DE | 19801892 A1 | 7/1999 |
| EP | 0490191 A2 | 6/1992 |
| EP | 0620243 A1 | 10/1994 |
| EP | 3281965 A1 | 2/2018 |

OTHER PUBLICATIONS

Bondfast® CG5001 Datasheet from UL Prospector. Evidentiary reference. (Year: 2024).*
Jul. 22, 2019 International Search Report issued in International Patent Application No. PCT/EP2019/067528.
Jul. 22, 2019 Written Opinion issued in International Patent Application No. PCT/EP2019/067528.

* cited by examiner

*Primary Examiner* — Michael M Dollinger
(74) *Attorney, Agent, or Firm* — Oliff PLC

(57) ABSTRACT

A single-component sealant or adhesive composition, including: an aqueous polymer dispersion including water and at least one water-dispersed polymer P, at least one water-dispersed or water-dissolved epoxy- or isocyanate-functional cross-linker C with a nominal epoxy- or isocyanate-functionality of at least 2, wherein the at least one water-dispersed polymer P has functional groups selected from carboxylic acid groups, amino groups, and hydroxyl groups, and wherein the epoxy- or isocyanate-functional cross-linker C has a molecular weight of at least 1000 g/mol or a number average molecular weight $M_n$, determined by means of GPC against polystyrene as standard, of at least 1000 g/mol, and wherein the composition includes between 0.1 and 50, preferably between 0.1 and 10 parts by weight of said epoxy- or isocyanate-functional cross-linker C per 100 parts by weight of the at least one water-dispersed polymer P.

13 Claims, No Drawings

WATER-BASED COMPOSITION WITH CHEMICAL CROSS-LINKING

TECHNICAL FIELD

The invention relates to aqueous one-component sealants and adhesives based on polymer dispersions and their use.

BACKGROUND OF THE INVENTION

Single-component sealant or adhesives and adhesives based on aqueous dispersions of polymers are commonly used, for example in the construction industry for sealing joints or coating surfaces to form a protective layer or to seal joints or surfaces against water and other ambient influences.

Compared to solvent-based sealants, water-based sealants mainly have the advantage that they do not emit as many volatile organic compounds (VOC) that are hazardous to health and the environment. Furthermore, they have generally a lower odor and are thus more consumer-friendly and suitable for indoor applications. Their curing or rather hardening mechanism to form a durable, elastic sealant or adhesive material mainly involves drying of substantial parts of the water contained in the dispersion and increasing physical interactions between the polymers contained therein with decreasing water content. Such sealants and adhesives based on aqueous polymer dispersions thus usually simply solidify by evaporation of water. If the ambient temperature exceeds the minimum film forming temperature (MFFT), the water starts to evaporate at a significant rate and the polymer chains entangle and form a film. The cohesion of such materials is primarily based on physical interactions. Comparable to typical thermoplasts, these dried compositions normally suffer from mediocre mechanical properties, a tendency to creep under static loads, poor heat resistance, and swelling in many media such as water or solvents.

One option to overcome these drawbacks is the use of chemical crosslinking reactions, e.g. with isocyanates. These systems are, however, normally not storage stable in the form of single-component (1K) systems and need to be formulated at least in two-component (2K) systems with separated storage of the reactive species and the need for mixing before application. Other known options for chemical cross-linking involve the use of oxazolines, or carbodiimides, or multivalent ions such as Zirconium. However, also in these cases, the storage stability in 1K systems is often low, and the gain of mechanical performance is often not comparable to true 2K systems.

EP 3 281 965 A1 (Kaneka Corp.) discloses curable resin compositions comprising epoxy resins with polymer fine particles dispersed therein, as well as blocked urethane compounds. These compositions are not water-based and therefore do not possess the advantages of water-based polymer dispersions.

US 2015/0152300 A1 (Auto Chemical Industry) discloses adhesive compositions containing a polyurethane-polyolefin complex that can be prepared using a water- and solvent-based polyurethane dispersion. However, due to the requirement of solvents during preparation, the low VOC benefits of a purely water-based composition are not achieved.

There is therefore a need for 1K water-based sealants and adhesives with strong mechanical properties and resistance, e.g. towards water immersion, which at the same time exhibit good storage stability.

SUMMARY OF THE INVENTION

The object of the present invention is to provide a single-component water-based sealant or adhesive with excellent mechanical properties and resistance, e.g. towards water immersion, which at the same time exhibits good storage stability.

The composition according to the present invention is especially suitable for sealing joints or surfaces, but may also be employed as, in particular elastic, adhesive.

Surprisingly, it has been found that by adding isocyanate- or epoxy-functional cross-linkers of high molecular weight, in particular polymers or prepolymers, with a nominal functionality (f) of at least 2 to water-based sealants or adhesives comprising polymers with selected functional groups, these object could be achieved. Although the isocyanate groups in principle may react with the contained water, and the epoxy functional groups in principle may react with functional groups, such as carboxylic groups, in the polymer, it was surprisingly found that the storage stability of the composition is still good.

Normally, crosslinking reactions result in a higher hardness, strength and water resistance, whereas the flexibility decreases. Surprisingly, however, it was found that when isocyanate-functional or epoxy-functional cross-linkers with f≥2 and a molecular weight or average molecular weight $M_n$ of at least 1000 g/mol were used, both strength and elongation increase compared to non-crosslinked compositions or compositions cross-linked by the methods of the state of the art. In addition, water resistance increases significantly.

Surprisingly, the shore hardness remains similar, which is advantageous for the use as sealant. The composition according to the present invention possesses increased tensile strength, increased elongation at break, increased water resistance, and increased storage stability compared to non-inventive such 1K systems. At the same time, however, the inventive composition does not suffer from increased Shore A hardness compared to the state of the art.

According to another aspect of the present invention, a method for sealing a joint or adhesively joining two substrates is provided.

DETAILED DESCRIPTION OF THE INVENTION

Substance names beginning with "poly", such as polyamine, polyol or polyisocyanate, designate substances which formally contain, per molecule, two or more of the functional groups occurring in their names. For instance, a polyol refers to a compound having at least two hydroxyl groups. A polyether refers to a compound having at least two ether groups. A "primary polyamine" refers to a compound having at least two primary amino groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth)acrylate monomers and copolymers of (meth)acrylate monomers with other vinyl group containing monomers are also included within the term "polyacrylate polymer". The terms "polyacrylate polymer", "polyacrylate" and "acrylate polymer" are used interchangeably.

The term "solid epoxy resin" is very well known to the person skilled in the art in the epoxide sector and is used in contrast with "liquid epoxy resin". The glass transition temperature $T_G$ of the solid epoxy resins is above room temperature of 25° C., i.e. they can be comminuted at room temperature to give pourable particles.

An "aromatic isocyanate" or "aliphatic isocyanate" refers to an isocyanate wherein the isocyanate groups are bonded directly to an aromatic or aliphatic carbon atom. Accordingly, isocyanate groups of this kind are referred to as "aromatic isocyanate groups" or "aliphatic isocyanate groups".

The term "viscosity" refers to the dynamic viscosity or shear viscosity which is determined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

The term "shelf life" designates a time period after which a dispersion adhesive composition has substantially coagulated, separated or settled such that it cannot be readily applied to a surface of a substrate as homogeneous, uniform film or bead.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "room temperature" (abbreviated "RT") designates a temperature of 23° C.

The term "standard pressure" designates an absolute pressure of 1 bar.

The present invention relates in a first aspect of the invention to a single-component sealant or adhesive composition, comprising:
  a) an aqueous polymer dispersion comprising water and at least one water-dispersed polymer P,
  b) at least one water-dispersed or water-dissolved epoxy- or isocyanate-functional cross-linker C with a nominal epoxy- or isocyanate-functionality of at least 2,
  wherein said at least one water-dispersed polymer P has functional groups selected from carboxylic acid groups, amino groups, and hydroxyl groups, and
  wherein said epoxy- or isocyanate-functional cross-linker C has a molecular weight of at least 1000 g/mol or a number average molecular weight $M_n$, determined by means of GPC against polystyrene as standard, of at least 1000 g/mol, and
  wherein the composition comprises between 0.1 and 50, preferably between 0.1 and 10 parts by weight of said epoxy- or isocyanate-functional cross-linker C per 100 parts by weight of said at least one water-dispersed polymer P.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase.

The term "aqueous polymer dispersion" refers to a polymer dispersion having water as the main carrier. Preferably, the "aqueous" refers to a 100% water carrier.

Preferably, the aqueous polymer dispersion and accordingly the sealant or adhesive composition according to the present invention are free of organic solvents, in particular free of volatile organic compounds. The aqueous polymer dispersion and accordingly the sealant or adhesive composition according to the present invention are preferably prepared and formulated without volatile organic compounds and only contain water as volatile carrier or liquid phase.

The term "volatile organic compounds" (VOC) herein means organic compounds that have a boiling point of less than 250° C. at a standard pressure of 101.3 kPa.

The single-component sealant or adhesive composition according to the present invention comprises as a first essential ingredient an aqueous polymer dispersion comprising water and at least one water-dispersed polymer P, wherein said at least one water-dispersed polymer P has functional groups selected from carboxylic acid groups, amino groups, and hydroxyl groups.

The optimal amount of functional groups selected from carboxylic acid groups, amino groups, and hydroxyl groups in the at least one water-dispersed polymer P is of course variable and depends, for example, on the amount of epoxy- or isocyanate-functional cross-linker C in the composition and the nominal functionality of epoxy- or isocyanate-functional cross-linker C. The skilled person in the field of polymer chemistry and/or formulation of reactive polymer systems is able to estimate or determine by routine experimentation a suitable density of functional groups selected from carboxylic acid groups, amino groups, and/or hydroxyl groups, in polymer P. In general, the amount or density of functional groups selected from carboxylic acid groups, amino groups, and/or hydroxyl groups, in polymer P should be sufficiently high that a proper chemical cross-linking is possible with the epoxy- or isocyanate-functional cross-linker C present. On the other hand, the composition is sufficiently robust that even a significant deviation of a 1:1 molar ratio of functional groups in polymer P to functional groups in cross-linker C still leads to a useful, chemically curable composition.

Preferably, the molar ratio of reactive functional groups selected from carboxylic acid groups, amino groups, and hydroxyl groups in polymer P to epoxy- or isocyanate functional groups in cross-linker C in the composition is between 1:10 and 10:1, in particular between 1:5 and 5:1, more preferably between 1:2 and 2:1, especially between 1:1.5 and 1.5:1, most preferably between 1:1.1 and 1.1:1.

Suitable polymers P include, for example, polyvinyl acetate, polyvinyl alcohol, polyacrylates, polyurethanes, polyurethane-acrylates, natural based polymers, carboxylated or otherwise functionalized polystyrene-copolymers, carboxylated or otherwise functionalized butadiene styrene copolymers, carboxylated or otherwise functionalized butadiene rubbers, carboxylated or otherwise functionalized styrene-butadiene copolymers, carboxylated or otherwise functionalized styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, ethylene-acrylic ester copolymers, and carboxylated or otherwise functionalized polyolefinic block copolymers. The polymers mentioned above based on (meth)acrylate ester or acetate ester monomers need to contain a sufficiently high amount of non-esterified (meth)acrylate or acetate monomers or other functional groups as detailed further below.

The above-mentioned copolymers, meaning polymers made from more than one type of monomer, can be block type copolymers or random copolymers.

The amount of said at least one water-dispersed polymer P comprised in the composition preferably is between 10 and 80 wt.-%, preferably between 15 and 60 wt.-%, in particular between 20 and 45 wt.-%, more preferably between 25 and 35 wt.-%, based on the total weight of the sealant after drying in air during 7 days at 40° C.

In preferred embodiments of the single-component sealant or adhesive composition according to the present invention, the at least one water-dispersed polymer P is selected from polyurethane polymers, poly(meth)acrylate polymers, styrene-(meth)acrylate copolymers, vinyl-acetate-ethylene copolymers, and vinyl-acetate-(meth)acrylate copolymers.

Polymers P must be functionalized, meaning they contain further functional groups selected from carboxylic acid groups, amino groups, and hydroxyl groups, but may additionally also comprise other functional groups, such as anhydride, acrylate, silane, and/or glycidylmethacrylate groups.

In some preferred embodiments, the aqueous polymer dispersion comprises of one or more water-dispersed polymers P, preferably free-radically polymerized polymer(s) obtained from ethylenically unsaturated monomers or polyurethane polymers. Preferably, in the case of free-radically polymerized polymer(s), such polymers contain principal monomers selected from the group consisting of $C_1$-$C_{20}$-alkyl (meth)acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers. In particular, acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like, may be used. Silicon-containing monomers such as, for example, vinyl trialkoxysilanes including vinyl trimethoxysilane, allyl trialkoxysilanes including allyl trimethoxysilane, (meth) acryloxyalkyl trialkoxysilanes including methacryloxypropyl trimethoxysilane, (meth)acryloxyalkyl alkyldialkoxysilanes including methacryloxypropyl methyldiethoxysilane, (meth)acryloxyalkoxyalkyl trialkoxy silanes including methacryloxyethoxyethyl trimethoxysilane, and mercaptoalkyl trialkoxysilanes including mercaptopropyl trimethoxysilane may also be incorporated, preferably at a level of from about 0.01% to about 6%, by weight based on the weight of the acrylic emulsion copolymer. Proportions of ethylenically-unsaturated monocarboxylic acids such as, for example, from 0 to about 7%, by weight, based on the weight of the acrylic emulsion copolymer, methacrylic acid or acrylic acid may also preferably be used.

Preferred $C_1$-$C_{20}$-alkyl (meth)acrylates for the production of (meth)acrylate-based polymers P include (meth)acrylic acid alkyl esters having a $C_1$-$C_{12}$ alkyl radical, such as methyl (meth)acrylate, n-butyl acrylate, ethyl acrylate, and 2-ethylhexyl acrylate. Polymers obtained by polymerization of mixtures of acrylic acid alkyl esters and (meth)acrylic acid alkyl esters can be mentioned as particularly suitable polymers.

Suitable vinyl esters of carboxylic acids containing up to 20 carbon atoms include, for example, vinyl laurate, vinyl stearate, vinyl propionate, vinyl esters of tertiary saturated monocarboxylic acids, vinyl acetate, and mixtures of two or more thereof.

Suitable vinyl aromatic compounds include, for example, vinyltoluene, α- and p-methylstyrene, α-butylstyrene, 4-n-butylstyrene, 4-n-decylstyrene and styrene. Acrylonitrile and methacrylonitrile are presented as examples of suitable nitriles.

Suitable vinyl halides include, for example ethylenically unsaturated compounds substituted by chlorine, fluorine or bromine, such as vinyl chloride or vinylidene chloride, and mixtures thereof.

For the preparation of suitable water-dispersed or -dispersible polymers P based on acrylic monomers there are furthermore suitable non-aromatic hydrocarbons containing from 2 to 8 carbon atoms and at least two olefinic double bonds, such as butadiene, isoprene and chloroprene.

Further monomers that may be present in the water-dispersible polymer in an amount of 0-40% by weight, preferably from 0-20% by weight and most preferably 0.2-10% by weight, are especially $C_1$-$C_{10}$-hydroxyalkyl (meth)acrylates, (meth)acrylamides and derivatives thereof substituted on the nitrogen by $C_1$-$C_4$-alkyl, ethylenically unsaturated carboxylic acids, dicarboxylic acids, their semi-esters and anhydrides, for example (meth)acrylic acid, maleic acid, fumaric acid, maleic acid anhydride, maleic acid and fumaric acid semi-esters and itaconic acid.

Suitable water-dispersed or -dispersible polymers P preferably have a number average molecular weight ($M_n$) in the range of 5,000-200,000 g/mol, preferably 25,000-200,000 g/mol, most preferably 50,000-200,000 g/mol. Suitable water-dispersed or -dispersible polymers P preferably have a weight average molecular weight ($M_w$) in the range of 50,000-800,000 g/mol, preferably 100,000-800,000 g/mol, most preferably 150,000-800,000 g/mol. Preferably, the at least one water-dispersed or -dispersible polymer P has a number average molecular weight ($M_n$) of not more than 200,000 g/mol and a weight average molecular weight ($M_w$) of at least 100,000 g/mol.

The number average and weight average molecular weights can be determined by gel permeation chromatography using polystyrene as standard in a polymer solution in tetrahydrofuran.

The water-dispersed polymers/copolymers based on ethylenically unsaturated monomers which are useful as polymer P can be prepared by free-radical polymerization using substance, solution, suspension or emulsion polymerization techniques, which are known to the person skilled in the art. Preferably, if polymer P is polyurethane-based, thus forming a polyurethane dispersion (PUD), said polymer dispersion is obtained by dispersing an NCO-functional polyurethane polymer in water. Preferably, (meth)acrylate-based dispersions of polymer P are obtained by emulsion polymerization, so that aqueous polymer dispersions are obtained.

Suitable polyacrylate dispersions and preparation method thereof are described, for example in EP 0490191 A2, DE 19801892 A1, and in EP 0620243.

Suitable dispersible such polymers or ready-to-use aqueous dispersions thereof are commercially available, for example by BASF under the trade name Acronal®, or by DOW under the trade name Primal®, or by SYNTHOMER under the trade names Plextol® and Revacryl®.

Furthermore suitable and preferred as polymer P are dispersible polyurethane polymers which in water-dispersed form are also denoted as polyurethane dispersions (PUDs). One important requirement is that comprise functional groups selected from carboxylic acid groups, amino groups, and hydroxyl groups. Also these polymers are commercially available as dispersible polymers or ready-to-use dispersions or they can be produced by known methods.

The single-component sealant or adhesive composition according to the present invention comprises as a second essential ingredient at least one water-dispersed or water-dissolved epoxy- or isocyanate-functional cross-linker C with a nominal epoxy- or isocyanate-functionality of at least 2, wherein said epoxy- or isocyanate-functional cross-linker C has a molecular weight of at least 1000 g/mol or a number average molecular weight $M_n$, determined by means of GPC against polystyrene as standard, of at least 1000 g/mol, and wherein the composition comprises between 0.1 and 50, preferably between 0.1 and 10 parts by weight of said epoxy- or isocyanate-functional cross-linker C per 100 parts by weight of said at least one water-dispersed polymer P.

The term "nominal functionality" (f) means the average or actual functionality of a given substance or polymer with regards to a specific functional group. For example, a pure polyether diol has a hydroxyl nominal functionality of f=2. Likewise, glycerin has a nominal functionality of 3 with regards to hydroxyl groups.

In preferred embodiments, said epoxy- or isocyanate-functional cross-linker C is a polymer or resin.

In preferred embodiments, said epoxy- or isocyanate-functional cross-linker C is a polymer with an organic backbone selected from polyurethane, polyether, polyester, polybutadiene, polycarbonate, or polyacrylate.

In the same or other preferred embodiments, said epoxy- or isocyanate-functional cross-linker C is an isocyanate-functional polymer with an isocyanate content of less than 10 wt.-%, preferably less than 5 wt.-%, based on the polymer, wherein the polymer is obtained from a polyether, polyester, polybutadiene, polycarbonate, or polyacrylate polyol and a polyisocyanate, preferably an aliphatic polyisocyanate.

A suitable polyisocyanate is especially a commercially available polyisocyanate, especially aromatic di- or triisocyanates, preferably diphenylmethane 4,4'- or 2,4'- or 2,2'-diisocyanate or any mixtures of these isomers (MDI), tolylene 2,4- or 2,6-diisocyanate or any mixtures of these isomers (TDI), mixtures of MDI and MDI homologs (polymeric MDI or PMDI), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODD, dianisidine diisocyanate (DADI), tris(4-isocyanatophenyl)methane or tris(4-isocyanatophenyl) thiophosphate; preferably MDI or TDI;

aliphatic, cycloaliphatic or arylaliphatic di- or triisocyanates, preferably tetramethylene 1,4-diisocyanate, 2-methylpentamethylene 1,5-diisocyanate, hexamethylene 1,6-diisocyanate (HDI), 2,2,4- and/or 2,4,4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- and/or -2,6-diisocyanatocyclohexane ($H_6$TDI), 1-isocyanato-3,3,5-trimethyl-5-isocyanatomethylcyclohexane (IPDI), perhydro-2,4'- and/or -4,4'-diphenylmethane diisocyanate ($H_{12}$MDI), 1,3- or 1,4-bis-(isocyanatomethyl)cyclohexane, m- or p-xylylene diisocyanate, tetramethylxylylene 1,3- or 1,4-diisocyanate, 1,3,5-tris(isocyanatomethyl)benzene, bis(1-isocyanato-1-methylethyl)naphthalene, dimer or trimer fatty acid isocyanates such as, in particular, 3,6-bis(9-isocyanatononyl)-4,5-di-(1-heptenyl)cyclohexene (dimeryl diisocyanate); preferably $H_{12}$MDI or HDI or IPDI;

oligomers or derivatives of the di- or triisocyanates mentioned, especially derived from HDI, IPDI, MDI or TDI, especially oligomers containing uretdione or isocyanurate or iminooxadiazinedione groups or various groups among these; or di- or polyfunctional derivatives containing ester or urea or urethane or biuret or allophanate or carbodiimide or uretonimine or oxadiazinetrione groups or various groups among these. In practice, polyisocyanates of this kind are typically mixtures of substances having different degrees of oligomerization and/or chemical structures. They especially have an average NCO functionality of 2.1 to 4.0.

A particularly preferred polyisocyanate is HDI, IPDI, $H_{12}$MDI, TDI, MDI or a form of MDI which is liquid at room temperature.

A form of MDI which is liquid at room temperature is either 4,4'-MDI liquefied by partial chemical modification—especially carbodiimidization or uretonimine formation or adduct formation with polyols—or it is a mixture of 4,4'-MDI with other MDI isomers (2,4'-MDI and/or 2,2'-MDI), and/or with MDI oligomers and/or MDI homologs (PMDI), that has been brought about selectively by blending or results from the production process.

Preferred polyisocyanates for preparation of a polyurethane polymer containing isocyanate groups are the polyisocyanates already mentioned, especially the diisocyanates, especially MDI, TDI, IPDI, HDI or $H_{12}$MDI. Preferred are aliphatic such isocyanates, in particular IPDI, HDI or $H_{12}$MDI. Most preferred is IPDI. This preference refers to cross-linker C. In case a polyurethane-based polymer P is used, it may be based on any isocyanate mentioned above without limitation or preference.

A polyurethane polymer containing isocyanate groups suitable as cross-linker C is in particular obtained from the reaction of at least one polyol with a superstoichiometric amount of at least one polyisocyanate. The reaction is preferably conducted with exclusion of moisture at a temperature in the range from 50 to 160° C., optionally in the presence of suitable catalysts. The NCO/OH ratio is preferably in the range from 1.3/1 to 2.5/1. The polyisocyanate remaining after the conversion of the OH groups in the reaction mixture, especially monomeric diisocyanate, can be removed if required, especially by means of distillation, which is preferable in the case of a high NCO/OH ratio.

However, any remaining isocyanate monomers will likely be quenched when the prepolymer is dispersed or dissolved in water. The polyurethane polymer obtained preferably has a content of free isocyanate groups in the range from 0.5% to 10% by weight, especially 1% to 5% by weight, more preferably 1% to 3% by weight. The polyurethane polymer can optionally be prepared with additional use of plasticizers or solvents, in which case the plasticizers or solvents used do not contain any groups reactive toward isocyanates.

Suitable polyols for the synthesis of isocyanate-functional polymers suitable as isocyanate-functional cross-linker C are commercial polyols or mixtures thereof, especially polyether polyols, especially polyoxyalkylenediole and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having multiple OH or NH groups, for example 1,2-ethanediol, 1,2- or 1,3-propanediol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, 1,3- or 1,4-cyclohexanedimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene-acrylonitrile particles (SAN) or polyurea or polyhydrazodicarbonamide particles (PHD).

Preferred polyether polyols are polyoxypropylenediols or polyoxypropylenetriols, or what are called ethylene oxide-terminated (EO-endcapped) polyoxypropylenediols or -triols. The latter are mixed polyoxyethylene-polyoxypropylene polyols which are especially obtained in that polyoxypropylenediols or -triols, on conclusion of the polypropoxylation reaction, are further alkoxylated with ethylene oxide and hence ultimately have primary hydroxyl groups.

Preferred polyether polyols have a degree of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid or hexahydrophthalic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by oxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can, for example, be derivatized to hydroxy fatty acid esters by hydroformylation and hydrogenation.

Polyhydrocarbon polyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers as produced, for example, by Kraton Polymers; polyhydroxy-functional polymers of dienes, especially of 1,3-butadiene, which can especially also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers as preparable, for example, from epoxides or amino alcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Most preferred are polyether polyols, especially polyoxypropylenedi- or triols or ethylene oxide-terminated polyoxypropylenedi- or triols.

Preference is given to polyols having an average molecular weight in the range from 400 to 20,000 g/mol, preferably from 1,000 to 15,000 g/mol.

Preference is given to polyols having an average OH functionality in the range from 1.6 to 3.

Preference is given to polyols that are liquid at room temperature.

In the preparation of a polyurethane polymer containing isocyanate groups, it is also possible to use fractions of di- or polyfunctional alcohols, especially 1,2-ethanediol, 1,2-propanediol, 1,3-propanediol, 2-methyl-1,3-propanediol, 1,2-butanediol, 1,3-butanediol, 1,4-butanediol, 1,3-pentanediol, 1,5-pentanediol, 3-methyl-1,5-pentanediol, neopentyl glycol, dibromoneopentyl glycol, 1,2-hexanediol, 1,6-hexanediol, 1,7-heptanediol, 1,2-octanediol, 1,8-octanediol, 2-ethyl-1,3-hexanediol, diethylene glycol, triethylene glycol, dipropylene glycol, tripropylene glycol, 1,3- or 1,4-cyclohexanedimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols such as, in particular, xylitol, sorbitol and mannitol, or sugars such as, in particular, sucrose, or alkoxylated derivatives of the alcohols mentioned or mixtures of the alcohols mentioned.

The polyurethane polymer containing isocyanate groups suitable as cross-linker C preferably has an average molecular weight in the range from 1,500 to 20,000 g/mol, especially 2,000 to 15,000 g/mol.

It is preferably liquid at room temperature.

In preferred embodiments, the composition according to the present invention comprises, preferably together with an isocyanate-functional cross-linker C, an aldimine of formula (I).

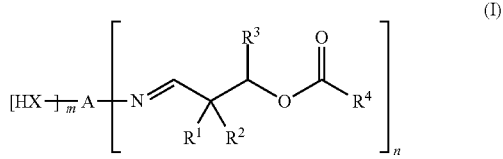

(I)

In formula (I), A is the rest of an amine after removal of n primary amino groups and m HX groups; n is 1 or 2 or 3 or 4; m is 0 or 1 or 2 or 3 or 4, with the provision that m+n is 2 or 3 or 4; $R^1$ and $R^2$ are either each independently a monovalent hydrocarbon radical with 1 to 12 C atoms, or together form a divalent hydrocarbon radical with 4 to 12 C atoms that is part of an optionally substituted carbocyclic ring with 5 to 8, preferably 6, C atoms; $R^3$ is a hydrogen atom or an alkyl-, cycloalkyl-, arylalkyl-, or alkoxycarbonyl radical with 1 to 12 C atoms; $R^4$ is a hydrogen atom or a monovalent radical with 1 to 20 C atoms selected from alkyl-, cycloalkyl-, arylalkyl-, aryl-, —$OR^{5'}$, —$SR^{5'}$, and —$NR^{5'}R^{5''}$, wherein $R^{5'}$ and $R^{5''}$ either each independently are hydrocarbon radicals or together form an alkylene radical that is part of a 5-, 6-, or 7-membered ring; and X is O or S or $NR^6$, wherein $R^6$ is a hydrocarbon radical with 1 to 20 C atoms which is optionally substituted with a carbonic acid ester-, nitrile-, nitro-, phosphonic acid ester-, sulphone-, or sulphonic acid ester-group.

Preferably, A is a radical selected from the group consisting of 2-methyl-1,5-pentylene; 1,6-hexylene; 2,2(4),4-trimethyl-1,6-hexamethylene; 1,8-octylene; 1,10-decylene; 1,12-dodecylene; (1,5,5-trimethylcyclohexan-1-yl)methane-1.3; 1,3-cyclohexylene-bis(methylene); 1,4-cyclohexylene-bis(methylene); 1,3-phenylene-bis(methylene); 2- and/or 4-methyl-1,3-hexylene; 3-oxa-1,5-pentylene; 3,6-dioxa-1,8-octylene; 4,7-dioxa-1,10-decylene; α,ω-polyoxypropylene having a molecular weight in the range of 170 to 450 g/mol; and trimethylolpropane-initiated tris(ω-polyoxypropylene) having an average molecular weight in the range of 330 to 450 g/mol.

Particularly preferably, A is 1,6-hexylene; (1,5,5-trimethylcyclohexane-1-yl) methane-1,3; 3-oxa-1,5-pentylene; α,ω-polyoxypropylene having an average molecular weight of about 200 g/mol or trimethylolpropane tris (ω-polyoxypropylene) having an average molecular weight of about 390 g/mol. Most preferably, A is 1,6-hexylene or (1,5,5-trimethylcyclohexane-1-yl)methane-1,3.

Preferably, $R^1$ and $R^2$ are each methyl.

Preferably, $R^3$ is hydrogen.

$R^4$ is preferably a linear alkyl radical having 11 to 20 C atoms, in particular a linear alkyl radical having 11 C atoms.

These aldimines are low viscosity and virtually odorless before, during, and after hydrolytic activation and crosslinking with isocyanates.

Preferably, m is 0 and n is 2 or 3, especially 2.

In the case where m is 1, n is preferably 1.

In the case where m is 1, X is preferably O.

An aldimine of the formula (I) is obtainable in particular from the condensation reaction of at least one primary amine of the formula (II) with at least one aldehyde of the formula (III).

(II)

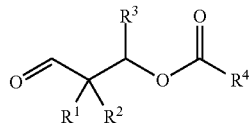

(III)

In formulae (II) and (III), parameters m, n, A, X, $R^1$, $R^2$, $R^3$, and $R^4$ have the same meanings as defined above.

For this condensation reaction, the aldehyde of the formula (III) is preferably used stoichiometrically or more than stoichiometrically based on the primary amino groups of the amine of the formula (II). The reaction is advantageously carried out at a temperature in the range of 15 to 120° C., if appropriate in the presence of a solvent or solvent-free. The released water is preferably removed, for example azeotropically by means of a suitable solvent, or directly from the reaction mixture by applying a vacuum.

Preferred amines of the formula (II) are selected from the group consisting of 1,5-diamino-2-methylpentane, 1,6-hexanediamine, 2,2,4- and 2,4,4-trimethyl-hexamethylenediamine, 1,8-octanediamine, 1,10-decanediamine, 1,12-dodecanediamine, 1-amino-3-aminomethyl-3,5,5-trimethylcyclohexane, 1,3-bis (aminomethyl) cyclohexane, 1,4-bis (aminomethyl) cyclohexane, 1,3-bis (aminomethyl) benzene, 2- and/or 4-methyl-1,3-diaminocyclohexane, 2-(2-aminoethoxy) ethanol, 3,6-dioxaoctane-1,8 diamine, 4,7-dioxadecane-1,10-diamine and polyoxypropylene amines having an average molecular weight in the range of 200 to 500 g/mol, in particular Jeffamine® D-230, Jeffamine® D-400 and Jeffamine® T-403.

Aldimines as outlined above are latent polyamines and improve the mechanical performance of compositions according to the present invention, in particular compositions comprising an isocyanate-functional cross-linker C.

In some preferred embodiments of the inventive single-component sealant or adhesive composition, said epoxy- or isocyanate-functional cross-linker C is an epoxy-functional resin, preferably with an epoxy equivalent weight of between 100 and 3000 g/eq, in particular between 100 and 1500 g/eq.

The epoxy resin with more than one epoxy group per molecule on the average suitable as cross-linker C is preferably a liquid epoxy resin or a solid epoxy resin. The term "solid epoxy resin" is very familiar to the person skilled in the art of epoxides, and is used in contrast to "liquid epoxy resins." The glass transition temperature of solid resins is above room temperature, i.e., at room temperature they can be broken up into free-flowing particles.

Preferred solid epoxy resins have formula (X):

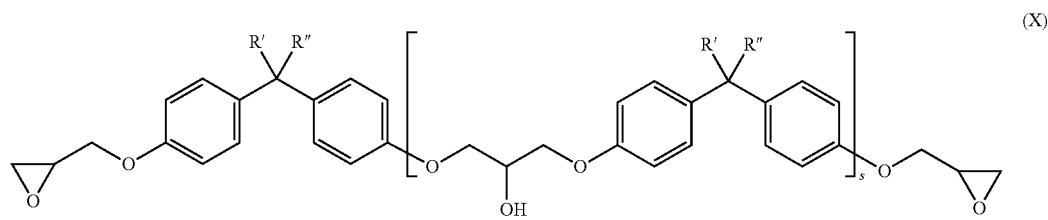

(X)

Here the substituents R' and R" each independently stand for either H or CH$_3$. Furthermore, the subscript s stands for a number>1.5, in particular a number from 2 to 12.

Such solid epoxy resins are commercially available, for example, from Dow or Huntsman or Hexion.

Compounds of formula (X) with a subscript s between 1 and 1.5 are called semisolid epoxy resins by the person skilled in the art. For the present invention here, they are also considered as solid resins. However, epoxy resins in the narrower sense are preferred, i.e., for which the subscript s has a value>1.5.

Preferred liquid epoxy resins have formula (XI):

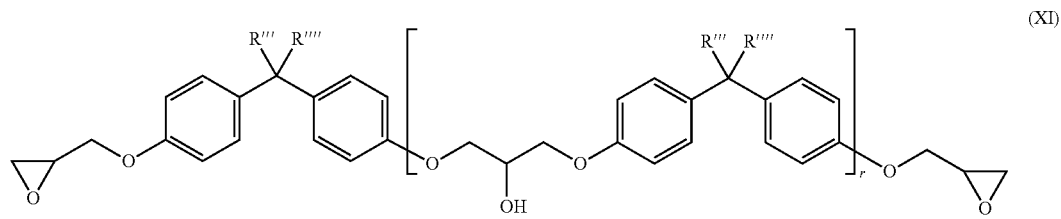

(XI)

Here the substituents R'' and R''' each independently stand for either H or CH$_3$. Furthermore, the subscript r stands for a number from 0 to 1. The subscript r preferably stands for a number less than 0.2.

These compounds are therefore preferably diglycidyl ethers of bisphenol A (DGEBA), bisphenol F, and bisphenol A/F (the designation "A/F" here refers to a mixture of acetone and formaldehyde used as the starting material in its manufacture). Such liquid resins are available, for example, as Araldite® GY 250, Araldite® PY 304, Araldite® GY 282 (Huntsman), or D.E.R.™ 331, or D.E.R.™ 330 (Dow), or Epikote 828 (Hexion).

Furthermore, "novolacs" are suitable as cross-linker C. These have in particular the following formula:

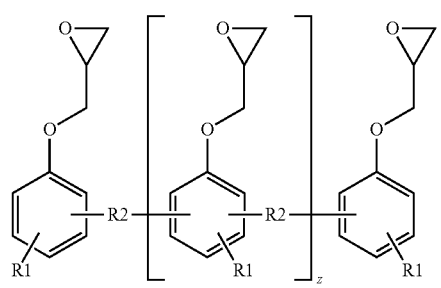

where

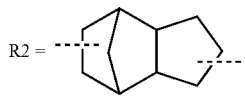

or $CH_2$, R1=H or methyl and z=0 to 7.

Here these can be in particular phenol or cresol novolacs (R2=$CH_2$).

Such epoxy resins are commercially available under the trade names EPN or ECN as well as Tactix® from Huntsman or as the D.E.N.™ product line from Dow Chemical.

Suitable epoxy-functional cross-linkers C are in particular:

Glycidyl ethers of difunctional saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether;

Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane;

Glycidyl ethers of phenol compounds and aniline compounds, in particular N,N-diglycidyl aniline, and p-aminophenyl triglycidyl ether;

Epoxidized di- and polycarboxylic acids, in particular phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester;

Epoxidized difunctional or trifunctional, low molecular weight or high molecular weight polyether polyols, in particular polyethylene glycol diglycidyl ether or polypropylene glycol diglycidyl ether.

Epoxy resins, in particular diglycidyl ethers of bisphenol A and/or F.

Hexanediol diglycidyl ether, polypropylene glycol diglycidyl ether, and polyethylene glycol diglycidyl ether are especially preferred.

Suitable liquid epoxy resin comprises customary technical epoxy resins which are fluid at room temperature and have a glass transition temperature of below 25° C. They are obtained conventionally from the glycidylization of compounds having at least two active hydrogen atoms, more particularly polyphenols, polyols or amines, by reaction with epichlorohydrin.

Suitability as liquid epoxy resin is possessed by aliphatic or cycloaliphatic epoxy resins, more particularly glycidyl ethers of saturated or unsaturated, branched or unbranched, cyclic or open-chain di-, tri- or tetrafunctional $C_2$ to $C_{30}$ alcohols, more particularly ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

glycidyl ethers of hydrogenated bisphenol A, F or A/F, or ring-hydrogenated liquid bisphenol A, F or A/F resins;

N-glycidyl derivatives of hydantoins, amides or heterocyclic nitrogen bases, such as, in particular, triglycidyl cyanurate or triglycidyl isocyanurate.

Preferred as liquid epoxy resin are aromatic epoxy resins, more particularly glycidyl ethers of polyphenols, more particularly of resorcinol, hydroquinone, pyrocatechol, 2,2-bis(4-hydroxyphenyl)propane (bisphenol A), bis(hydroxy-phenyl) methane (bisphenol F), bisphenol A/F, bis(4-hydroxy-3-methyl-phenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxy-phenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl) hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z)) 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxybiphenyl (DOD), 4,4'-dihydroxybenzophenone, bis(2-hydroxynaphth-1-yl)methane, bis(4-hydroxynaphth-1-yl) methane, 1,5-dihydroxynaphthalene, tris(4-hydroxyphenyl)methane, 1,1,2,2-tetrakis(4-hydroxyphenyl) ethane, bis(4-hydroxyphenyl) ether or bis(4-hydroxyphenyl) sulfone;

glycidyl ethers of condensation products of phenols with aldehydes, obtained under acidic conditions, more particularly glycidyl ethers of phenol-formaldehyde novolacs or cresol-formaldehyde novolacs;

glycidylization products of aromatic amines, more particularly of aniline, toluidine, 4-aminophenol, 4,4'-methylenediphenyldiamine, 4,4'-methylenediphenyldi (N-methyl)amine, 4,4'-[1,4-phenylenebis(1-methylethylidene)]bisaniline (bisaniline P) or 4,4'-[1, 3-phenylenebis(1-methylethylidene)]bisaniline (bisaniline M).

Particularly preferred as liquid epoxy resin are diglycidyl ethers of bisphenol A or bisphenol F or bisphenol A/F, as are available commercially, for example, from Dow, Huntsman or Momentive. These liquid epoxy resins have readily manageable viscosity and allow high strengths and resistance properties.

The inventive water-based single-component sealant or adhesive composition preferably comprises at least one filler.

The term "filler" refers in the present disclosure to solid particulate materials, which are commonly used as fillers in water-based single-component sealant or adhesive compositions and which preferably have low water-solubility. Preferably, the filler has a water-solubility of less than 0.1 g/100 g water, more preferably less than 0.05 g/100 g water, most preferably less than 0.01 g/100 g water, at a temperature of 20° C.

A filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid;

barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, titanium dioxide, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

Very preferred as filler for the composition of the invention is chalk (calcium carbonate). Especially preferred is uncoated chalk, most preferably uncoated, ground chalk, as available for example under the name Omyacarb® 40 GU (Omya AG, Switzerland).

The type and amount of filler is not particularly limited in the present invention. Examples of suitable fillers include calcium carbonate, calcium sulfate and calcium containing minerals such as limestone, calcite, chalk, dolomite, wollastonite, gypsum, apatite, phosphate rock, and mixtures thereof. Preferably, the filler has a median particle size $d_{50}$ in the range of 1.0-100.0 μm, more preferably of 1.0-60.0 μm, most preferably 2.0-50.0 μm. The term "median particle size $d_{50}$" refers in the present disclosure to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

Preferably, the one or more fillers are present in the single-component sealant or adhesive composition in a total amount of 10.0-60.0% by weight, preferably 15.0-50.0% by weight, most preferably 20.0-45.0% by weight, based on the total weight of the single-component sealant or adhesive composition.

In preferred embodiments, the sealant composition according to the present invention comprises at least one filler selected from calcium carbonate and/or titanium dioxide.

According to one or more embodiments, where the intended use of the single-component sealant or adhesive compositions is a coating, the water content of the single-component sealant or adhesive composition is 10.0-70.0% by volume, preferably 25.0-60.0% by volume, most preferably 35.0-50.0% by volume, based on the total volume of the single-component sealant or adhesive composition.

According to one or more embodiments, where the intended use of the single-component sealant or adhesive compositions is joint sealant or adhesive, the water content of the single-component sealant or adhesive composition is 15.0-45.0% by volume, preferably 20.0-35.0% by volume, most preferably 24.0-30.0% by volume, based on the total volume of the single-component sealant or adhesive composition.

According to one or more embodiments, the amount of aqueous polymer dispersion is 10.0-70.0% by weight, preferably 20.0-60.0% by weight, most preferably 25.0-40.0% by weight, based on the total weight of the single-component sealant or adhesive composition.

According to one or more embodiments, the single-component sealant or adhesive composition has a solids content of 40-90% by weight, preferably 50-88% by weight, most preferably 65-85% by weight.

The solids content as used herein refers to the portion of the aqueous dispersion adhesive composition, which when heated to a temperature of 105° C. for one hour at one atmosphere pressure does not volatilize. Accordingly, the solids content refers to polymeric materials, non-volatile plasticizers, inorganic solids and non-volatile organic materials, whereas the non-solid portion is generally comprised of water and any organic materials readily volatilized at 105° C.

According to one or more embodiments, the aqueous polymer dispersion has a solids content of 40-80% by weight, preferably 50-75% by weight, most preferably 55-70% by weight.

According to one or more embodiments, the weight ratio of water to polymer P in the single-component sealant or adhesive composition is between of 3:2 and 1:4, preferably between 1:1 and 1:3, most preferably between 9:11 and 3:7. According to one or more embodiments, the water-dispersed polymers P are present in the single-component sealant or adhesive composition in a total amount of 5.0-65.0% by weight, preferably 10.0-55.0% by weight, most preferably 15.0-45.0% by weight, based on the total weight of the single-component sealant or adhesive composition before drying.

The single-component sealant or adhesive composition preferably comprises said at least one water-dispersed polymer P with an amount of between 10 and 40 wt.-%, preferably between 12 and 30 wt.-%, more preferably between 15 and 25 wt.-%, based on the total weight of the composition before drying.

The single-component sealant or adhesive composition preferably contains a base in an amount that renders the pH of the composition to between >7 and 10, preferably between 8 and 9. Use of a base helps to improve shelf-life of the composition and facilitates the preparation.

All commercially available, preferably water-soluble, based may be used in an amount that renders the composition alkaline, preferably within the limits specified above. For example suitable are inorganic bases, such as NaOH, KOH, or LiOH, or organic bases, in particular amines.

In preferred embodiments, said base is a volatile amine compound. The term "volatile" means in this context that the base is mobile and may evaporate under standard conditions from the composition after curing/drying.

The single-component sealant or adhesive composition according to the present invention may furthermore contain at least one additive selected from the list consisting of a thixotropy agent, a dispersant, a filler, a plasticizer, an emulgator, a pigment, and a biocide. Furthermore, the inventive composition may comprise a plasticizer.

The single-component sealant or adhesive composition further optionally contains one or more plasticizers, preferably having at least one ester or ether group. The use of a plasticizer depends on the intended application and the polymer P used. Very soft polymers P with a very low $T_g$, such as for example −60° C., do not necessarily require the addition of a plasticizer. Furthermore, if the single-component sealant or adhesive composition is intended to be used as an elastic adhesive, plasticizer may also be minimized or omitted in the composition. For uses where a soft joint sealant (with low Shore A hardness) or a coating is required, and/or when using a polymer P with a higher $T_g$, such as for example −10° C., the use of a plasticizer is recommended.

The term "glass transition temperature" (abbreviated "$T_g$") refers to the temperature measured by differential scanning calorimetry (DSC) according to the ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Suitable plasticizers are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.

Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

The one or more plasticizers preferably having at least one ester or ether group can be present if at all in the single-component sealant or adhesive composition with a total amount of 0.5-30.0% by weight, for example 1.0-20% by weight, in particular 2.5-15.0% by weight, based on the total weight of the single-component sealant or adhesive composition.

In preferred embodiments of the single-component sealant or adhesive composition according to the present invention, the plasticizer preferably having at least one ester or ether group is selected from phthalate esters, cyclohexane esters, or benzoate esters.

The single-component sealant or adhesive composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters or acrylic liquid resins.

The single-component sealant or adhesive composition can also contain one or more further additives such as wetting agents, dispersion agents (dispersants), surfactants, emulgators, thickeners, anti-foams, flame retardants, stabilizers, colorants, antioxidants, UV-absorbers and/or biocides. Such further additives commonly used in water-based dispersion additives are known to a person skilled in the art.

Suitable anti-foams are preferably compounds based on mineral oils or silicones. Suitable thickeners include compounds that are based on (meth)acrylic acid copolymers, cellulose derivatives, mineral thickeners such as clays, silica, or mixtures thereof.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are customary preservatives, for example benzisothiazolinone (BIT), methylisothiazolinone (MIT), octylisothiazolinone (OIT), chloromethyl isothiazolinone (OMIT), and the like.

Surfactants are furthermore useful and preferred for the compositions according to the present invention. Suitable surfactants include anionic, non-ionic, cationic or amphoteric surfactants, but preferably a non-ionic or anionic surfactant is employed. Generally the amount of surfactant employed will range from about 0.1 to about 5% by weight, based on the total weight of the sealant composition.

Suitable non-ionic surfactants include fatty acid ethoxylates, fatty alcohol ethoxylates, polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

According to one or more embodiments, the total amount of the further additives is preferably 0.1-15.0% by weight, more preferably 0.5-10.0% by weight, based on the total weight of the single-component sealant or adhesive composition.

The single-component sealant or adhesive composition can be prepared by mixing the ingredients together at room temperature. Any suitable mixing apparatus can be used for the preparation of the adhesive composition without any special restrictions.

The single-component sealant or adhesive composition is especially suitable for sealing joints in or coating substrates of wood, plastic, such as PVC, or metal, mineral substrates such as plaster flooring, natural stone, concrete, cementitious levelling compounds or gypsum-based levelling compounds.

The single-component composition according to the present invention when intended to be used as a sealant preferably has a Shore A hardness after drying in air during 28 d at 23° C. with a relative humidity of 50% of between 5 and 50, preferably between 10 and 40, more preferably between 15 and 30.

The single-component composition according to the present invention when intended to be used as an adhesive preferably has a Shore A hardness after drying in air during 28 d at 23° C. with a relative humidity of 50% of at least 35, preferably at least 50, more preferably at least 60.

According to another aspect of the present invention, a method for sealing a joint between two substrates is provided, the method comprising steps of:
i) Applying the single-component sealant composition according to the present invention into the joint between two substrates,
ii) Exposing the wet sealant in the filled joint to air until the joint sealant and is dry and/or cured.

According to another aspect of the present invention, a method for adhesively joining two substrates is provided, the method comprising steps of:
i) Applying the single-component adhesive composition according to the present invention to a first substrate to form a wet layer of sealant on the first substrate, or applying the single-component adhesive according to the present invention to a first substrate and to a second substrate to form a wet layer of adhesive on both substrates,
ii) Exposing the wet layer to air,
iii) Joining a second substrate to the first substrate such that the wet layer on the first substrate is in contact with the second substrate, or such that both wet layers on both substrates are in contact with each other, to effect bonding there between.

The single-component sealant or adhesive composition can be applied on the surface of the substrate using for example, a toothed trowel or a roller.

According to another aspect of the present invention, use of the single-component sealant or adhesive composition of the present invention for sealing a joint between two substrates and/or for adhesively joining two substrates together is provided.

Yet another aspect of the present invention is a dried and/or cured single-component sealant or adhesive composition according to the present invention.

EXAMPLES

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example or test method.

Test Methods

The tensile strength, the elongation at break, and the modulus of elasticity at 0-100% elongation were determined according to DIN 53504 (tensile speed: 200 mm/min) on films with a layer thickness of 2 mm, cured for 14 days at 23° C. and 50% relative humidity.

The Shore A hardness was determined according to DIN 53505 on samples with a layer thickness of 6 mm, cured for 7 days, 14 days, and 28 days at 23° C. (RT) and 50% relative humidity, or for 7 days at 40° C. Furthermore, several samples were measured after curing for 7 days at 40° C., followed by immersion in water for 7 days. The water uptake (in wt.-%) was determined by a laboratory balance before and after water immersion with these samples. Shelf life stability was assessed by comparing the dispersion stability in terms of homogeneity and apparent viscosity after 7 d storage (RT) and 28 d storage (RT) in a closed container with a fresh sample. If there were no apparent changes that would point at preliminary cross-linking or irreversible changes of properties, the sample was given the result "OK".

Raw Materials

The raw materials and their description regarding important properties which were used for the example sealant compositions are shown in Table 1.

TABLE 1

Raw materials used for the example compositions.

| Raw material | Description |
| --- | --- |
| Emulsifier | High molecular fatty alcohol polyglycol ether sulphate |

TABLE 1-continued

Raw materials used for the example compositions.

| Raw material | Description |
| --- | --- |
| Dispersant | Polymeric dispersing agent based on acrylic acid sodium salt |
| Plasticizer | Diisononylphthalate (DINP) |
| Filler | Ground natural calcium carbonate (marble); median particle size ($d_{50}$): 5 μm |
| Pigment | Titanium dioxide ($TiO_2$) |
| Inorganic Thickener | Inert powdered attapulgite (($Mg, Al)_5Si_8O_{20}$•4 $H_2O$) |
| Organic Thickener | Polyurethane solution in water (Rheovis PU 1190) |

Preparation of Polyurethane-Functional Cross-Linkers C and Aldimines

Polyurethane-Functional Cross-Linker PU1

590 g of polyoxypropylene diol (Acclaim® 4200, from Covestro, OH number 28.5 mg KOH/g), 1180 g polyoxypropylene polyoxyethylene triol (Caradol® MD34-02, from Shell, OH number 35.0 mg KOH/g) and 230 g Isophorone diisocyanate (Vestanat® IPDI, Degussa) were reacted by a known method at 80° C. to a NCO-terminated polyurethane polymer liquid at room temperature having a content of free isocyanate groups of 2.1% by weight.

Polyurethane-Functional Cross-Linker PU2

3080 g polyoxypropylene diol (Acclaim® 4200, from Covestro, OH number 28.5 mg KOH/g), 1540 g polyoxypropylene polyoxyethylene triol (Caradol® MD34-02, from Shell, OH number 35.0 mg KOH/g) and 385 g Toluylene diisocyanate (Desmodur® T 80 P, Covestro) were reacted at 80° C. by a known method to a NCO-terminated polyurethane polymer liquid at room temperature having a content of free isocyanate groups of 1.5 wt.-%.

Aldimine LH: N,N'-bis(2,2-dimethyl-3-lauroyloxy-propyliden)-hexamethylene-1,6-diamine 622 g (2.2 mol) of 2,2-dimethyl-3-lauroyloxypropanal were placed in a round-bottomed flask under a nitrogen atmosphere. While stirring, 166.0 g (1 mol) of hexamethylene-1,6-diamine solution (70 wt.-% in water) was added and then the volatile constituents were removed at 80° C. and under 10 mbar vacuum. 702 g of an almost colorless liquid with an amine content of 2.85 mmol N/g, which corresponds to a calculated equivalent weight of about 351 g/Eq, were obtained.

Aldimine LI: N,N'-Bis(2,2-dimethyl-3-lauroyloxy-propyliden)-3-aminomethyl-3,5,5-trimethylcyclo-hexylamine As described for Aldimine LH, 598 g (2.1 mol) of 2,2-dimethyl-3-lauroyloxypropanal and 170.3 g (1 mol) of 3-aminomethyl-3,5,5-trimethylcyclohexylamine (Vestamin®® IPD from Evonik) were reacted. 732 g of an almost colorless liquid having an amine content of 2.73 mmol N/g, which corresponds to a calculated equivalent weight of about 367 g/Eq, were obtained.

Preparation of the Dispersion of Polymer P (50 wt.-% Solids in Water).

A polyurethane-based polymer P having carboxylic acid functions was prepared by m 86.9 parts by weight of a polyoxypropylene diol ($M_n$ 4000 g/mol) with 2 parts by weight of dimethylol propionic acid at 100° C., followed by the addition of 11.1 parts by weight of toluylendiisocyanate under nitrogen until the reaction was complete.

An aqueous dispersion (50% solids) of above polymer was prepared by mixing 49.29 parts by weight of water with 0.94 parts by weight of triethyl amine, 0.25 parts by weight of a defoamer, and 0.25 parts by weight of a non-ionic emulsifier, until a homogeneous mixture was obtained. Into this mixture, 49.29 parts by weight of above polymer P were slowly added and the mixture mixed for 1 h at 40° C. under vacuum. The result was a dispersion of polymer P (50 wt.-% solids in water) that was subsequently used in the example compositions.

Example Compositions C1 to C28

Several inventive and non-inventive (reference) compositions were prepared from the raw materials in Table 1 using the following mixing procedure.

Base Formulation

TABLE 2

Raw materials used for the example compositions.

| Ingredient | Amount (weight parts) |
|---|---|
| Dispersion of polymer P (50 wt.-% solids in water). | 50.0 |
| Cross-linker C | 0-10 (see Table 3 for respective amount) |
| Emulsifier | 0.5 |
| Dispersant | 0.5 |
| Plasticizer | 19.0 |
| Filler | 26.0 |
| Pigment | 2.0 |
| Inorganic Thickener | 1.0 |
| Organic Thickener | 1.0 |

Mixing Procedure

All example compositions were prepared in a lab mixer using the following procedure:
a) Adjusting of the dispersion of polymer P (50% solids) to pH 8 by using triethylamine.
b) Addition of the liquid raw materials except the organic thickener.
c) Addition of the powder raw materials in several steps, each interrupted by stirring. After addition of all powders, dispersing of the powders during 10 min.
d) Addition of the organic thickener.
e) Mixing under vacuum and filling of the preparations into cartridges.
f) Storing the cartridges for at least 24 h at 23° C. and 50% r.h. prior to initiating the testing procedure.

Details of the Example Compositions

Several non-inventive reference (denoted "Ref.") and inventive example compositions were made from the raw materials in Table 1 using the base formulation in Table 2 and by addition of cross-linker C as detailed in Table 3 according to the mixing procedure described above.

TABLE 3

Example compositions according to base formulation and with varying type and amount of cross-linker C.

| Example composition | Type (trade name) of cross-linker C | Functionality/ Chemistry | Amount (weight parts) |
|---|---|---|---|
| C1 (Ref.) | None | — | 0 |
| C2 | Ancarez ™ AR 555 (Air Products); waterborne solid epoxy resin with 55% solids, EEW = 550 g/eq. | Epoxy | 1 |
| C3 | | | 4 |
| C4 | | | 10 |
| C5 | Vinnapas ® LL 5921 (Wacker); dispersible solid epoxy resin, EEW = 1075 g/eq. | Epoxy | 1 |
| C6 | Isocyanate-terminated polyether polyurethane PU1 | Isocyanate (aliphatic) | 1 |
| C7 | | | 4 |
| C8 | | | 10 |
| C9 | Isocyanate-terminated polyether polyurethane PU2 | Isocyanate (aromatic) | 1 |
| C10 | | | 4 |
| C11 | | | 10 |
| C12 | 90 wt.-% Isocyanate-terminated polyether polyurethane PU1 and 10 wt.-% aldimine LH | Isocyanate (aliphatic) | 1 |
| C13 | | | 4 |
| C14 | | | 10 |
| C15 | 90 wt.-% Isocyanate-terminated polyether polyurethane PU2 and 10 wt.-% aldimine LI | Isocyanate (aromatic) | 1 |
| C16 | | | 4 |
| C17 (Ref.) | Tyzor ® 212 (Dorf Ketal); Zr chelate with 52% active ingredient in 1-propanol | Zirconate | 0.5 |
| C18 (Ref.) | | | 3 |
| C19 (Ref.) | Tytan ® AQ33 (Borica); Titanium ammonium lactate | Titanate | 0.39 |
| C20 (Ref.) | | | 2.37 |
| C21 (Ref.) | Epocros ® WS-300 (Nippon Shokubai); acrylic-based oxazoline functionalized reactive copolymer | Oxazoline | 2 |
| C22 (Ref.) | Epocros ® K-2010 (Nippon Shokubai); styrene/acrylic-based oxazoline functionalized reactive copolymer | Oxazoline | 2 |
| C23 (Ref.) | | | 10 |
| C24 (Ref.) | Picassian ® XL-702 (Stahl Polymers); Oligocarbodiimide | Carbodiimide | 5 |
| C25 (Ref.) | Desmodur ® XP 2802 (Covestro); | Carbodiimide | 1 |
| C26 (Ref.) | waterborne dispersion of a hydrophilically modified polyfunctional carbodiimide | | 5 |
| C27 (Ref.) | Tyzor ® TEAZ (Dorf Ketal); ethanolamine zirconium complex | Zirconate | 0.5 |
| C28 (Ref.) | | | 3 |

Test Results

The results of the test methods used on each example composition are detailed in Tables 4 to 7.

TABLE 4

Test results (mechanical tests, shelf life and water uptake)

| Test method conditions [unit] | C1 (Ref.) | C2 | C3 | C4 | C5 | C6 | C7 | C8 |
|---|---|---|---|---|---|---|---|---|
| Shelf life 7 d RT/28 d RT | OK/OK | OK/OK | OK/OK | OK/OK | OK/OK | OK/OK | OK/OK | OK/OK |
| Tensile strength DIN 53504 [MPa] | 1.5 | 3.0 | 2.8 | 3.0 | 2.7 | 2.8 | 2.8 | 2.3 |
| Elongation at break DIN 53504 [%] | 478 | 693 | 469 | 504 | 750 | 663 | 732 | 597 |

TABLE 4-continued

Test results (mechanical tests, shelf life and water uptake)

| Test method conditions [unit] | C1 (Ref.) | C2 | C3 | C4 | C5 | C6 | C7 | C8 |
|---|---|---|---|---|---|---|---|---|
| 50% modulus DIN 53504 [MPa] | 0.78 | 0.99 | 1.01 | 1.11 | 1.00 | 1.08 | 0.92 | 0.77 |
| Shore A 7 d RT | 41 | 39 | 40 | 41 | 38 | 43 | 40 | 38 |
| Shore A 14 d RT | 43 | 45 | 45 | 47 | 44 | 46 | 46 | 45 |
| Shore A 28 d RT | 46 | 46 | 47 | 50 | 47 | 49 | 48 | 47 |
| Shore A 7 d 40° C. | 48 | 48 | 50 | 50 | 49 | 50 | 48 | 44 |
| Shore A 7 d 40° C. + 7 d $H_2O$ | 9 | 24 | 28 | 31 | 18 | 16 | 18 | 22 |
| Shore A 7 d 40° C. + 7 d $H_2O$ + 7 d 40° C. | 45 | 50 | 51 | 52 | 50 | 52 | 50 | 42 |
| $H_2O$ uptake 7 d $H_2O$ [wt.-%] | 10.5 | 4.8 | 4.1 | 3.8 | 7.3 | 9.4 | 9.3 | 8.2 |

TABLE 5

Test results (mechanical tests, shelf life and water uptake)

| Test method conditions [unit] | C9 | C10 | C11 | C12 | C13 | C14 | C15 | C16 |
|---|---|---|---|---|---|---|---|---|
| Shelf life 7 d RT/28 d RT | OK/OK | OK/OK | OK/OK | OK/OK | OK/OK | OK/OK | OK/OK | OK/OK |
| Tensile strength DIN 53504 [MPa] | 1.9 | 2.0 | 2.0 | 2.1 | 2.7 | 3.1 | 1.8 | 1.8 |
| Elongation at break DIN 53504 [%] | 575 | 604 | 525 | 558 | 722 | 792 | 590 | 535 |
| 50% modulus DIN 53504 [MPa] | 0.88 | 0.84 | 0.82 | 0.90 | 0.96 | 0.81 | 0.85 | 0.89 |
| Shore A 7 d RT | 39 | 41 | 41 | 41 | 41 | 39 | 39 | 41 |
| Shore A 14 d RT | 44 | 44 | 43 | 43 | 43 | 41 | 42 | 42 |
| Shore A 28 d RT | 47 | 47 | 46 | 48 | 49 | 47 | 47 | 47 |
| Shore A 7 d 40° C. | 49 | 46 | 44 | 48 | 47 | 45 | 48 | 46 |
| Shore A 7 d 40° C. + 7 d $H_2O$ | 13 | 11 | 12 | 16 | 18 | 20 | 13 | 14 |
| Shore A 7 d 40° C. + 7 d $H_2O$ + 7 d 40° C. | 51 | 45 | 42 | 38 | 49 | 46 | 49 | 46 |
| $H_2O$ uptake 7 d $H_2O$ [wt.-%] | 10.4 | 11.6 | 13.1 | 8.4 | 7.9 | 7.8 | 9.2 | 9.0 |

The results of Table 4 and 5 show that the inventive sealant compositions C2 to C16 show improved tensile strength and at the same time improved elongation at break compared to reference C1 (without chemical curing). At the same time, in most cases, water uptake is significantly lower in the inventive examples. Final Shore A hardness is for all samples comparable to the non-chemical curing reference example C1.

TABLE 6

Test results (mechanical tests, shelf life and water uptake)

| Test method conditions [unit] | C17 (Ref.) | C18 (Ref.) | C19 (Ref.) | C20 (Ref.) | C21 (Ref.) | C22 (Ref.) | C23 (Ref.) |
|---|---|---|---|---|---|---|---|
| Shelf life 7 d RT/28 d RT | OK/OK | OK/OK | OK/OK | OK/OK | OK/OK | OK/OK | OK/OK |
| Tensile strength DIN 53504 [MPa] | 1.6 | 1.6 | 1.5 | 1.3 | 1.8 | 1.9 | 2.2 |
| Elongation at break DIN 53504 [%] | 265 | 208 | 502 | 277 | 473 | 372 | 308 |
| 50% modulus DIN 53504 [MPa] | 0.89 | 0.95 | 0.82 | 0.73 | 0.89 | 0.98 | 1.02 |
| Shore A 7 d RT | 43 | 45 | 42 | 42 | 39 | 38 | 37 |
| Shore A 14 d RT | 46 | 47 | 46 | 47 | 45 | 42 | 44 |
| Shore A 28 d RT | 49 | 49 | 48 | 50 | 47 | 47 | 46 |
| Shore A 7 d 40° C. | 49 | 50 | 51 | 50 | 50 | 46 | 47 |
| Shore A 7 d 40° C. + 7 d $H_2O$ | 13 | 18 | 10 | 11 | 16 | 14 | 21 |
| Shore A 7 d 40° C. + 7 d $H_2O$ + 7 d 40° C. | 48 | 47 | 46 | 48 | 47 | 52 | 47 |
| $H_2O$ uptake 7 d $H_2O$ [wt.-%] | 8.7 | 10.8 | 11.3 | 9.9 | 9.2 | 9.5 | 6.8 |

The non-inventive reference examples C17 to C28 which also comprise a chemical curing system (based on oxazolines, carbodiimides, or metal ions) generally show poorer elongation at break than the non-chemical curing reference example C1 and, more prominently so, than the inventive examples. Additionally, some reference examples (C20 and C28) show increased water uptake or poor tensile strength (C28).

TABLE 7

Test results (mechanical tests, shelf life and water uptake)

| Test method conditions [unit] | C24 (Ref.) | C25 (Ref.) | C26 (Ref.) | C27 (Ref.) | C28 (Ref.) |
| --- | --- | --- | --- | --- | --- |
| Shelf life 7 d RT/28 d RT | OK/OK | OK/OK | OK/OK | OK/OK | OK/OK |
| Tensile strength DIN 53504 [MPa] | 2.1 | 2.1 | 2.2 | 1.7 | 0.9 |
| Elongation at break DIN 53504 [%] | 227 | 442 | 270 | 498 | 564 |
| 50% modulus DIN 53504 [MPa] | 1.14 | 0.97 | 1.17 | 0.87 | 0.54 |
| Shore A 7 d RT | 46 | 45 | 50 | 40 | 36 |
| Shore A 14 d RT | 55 | 47 | 56 | 46 | 39 |
| Shore A 28 d RT | 57 | 48 | 56 | 46 | 40 |
| Shore A 7 d 40° C. | 57 | 51 | 57 | 47 | 40 |
| Shore A 7 d 40° C. + 7 d $H_2O$ | 32 | 17 | 33 | 14 | 15 |
| Shore A 7 d 40° C. + 7 d $H_2O$ + 7 d 40° C. | 52 | 52 | 57 | 48 | 48 |
| $H_2O$ uptake 7 d $H_2O$ [wt.-%] | 7.0 | 9.5 | 7.7 | 10.7 | 13.9 |

Only the inventive example compositions are able to increase both tensile strength and elongation at break, while at the same time exhibiting low water uptake and a Shore A hardness that is not significantly higher than a non-chemical curing system.

The invention claimed is:

1. A single-component sealant or adhesive composition, comprising:
   a) an aqueous polymer dispersion comprising water and at least one water-dispersed polymer P,
   b) at least one water-dispersed or water-dissolved isocyanate-functional cross-linker C with a nominal isocyanate-functionality of at least 2, and
   c) an aldimine of formula (I)

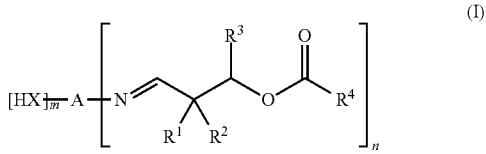

(I)

where A is the rest of an amine after removal of n primary amino groups and m HX groups; n is 1 or 2 or 3 or 4; m is 0 or 1 or 2 or 3 or 4, with the provision that m+n is 2 or 3 or 4; $R^1$ and $R^2$ are either each independently a monovalent hydrocarbon radical with 1 to 12 C atoms or together form a divalent hydrocarbon radical with 4 to 12 C atoms that is part of an optionally substituted carbocyclic ring with 5 to 8 C atoms; $R^3$ is a hydrogen atom or an alkyl-, cycloalkyl-, arylalkyl-, or alkoxycarbonyl radical with 1 to 12 C atoms; $R^4$ is a hydrogen atom or a monovalent radical with 1 to 20 C atoms selected from alkyl-, cycloalkyl-, arylalkyl-, aryl-, —$OR^{5'}$, —$SR^{5'}$, and —$NR^{5'}R^{5''}$, wherein $R^{5'}$ and $R^{5''}$ either each independently are hydrocarbon radicals or together form an alkylene radical that is part of a 5-, 6-, or 7-membered ring; and X is O or S or $NR^6$, wherein $R^6$ is a hydrocarbon radical with 1 to 20 C atoms which is optionally substituted with a carbonic acid ester-, nitrile-, nitro-, phosphonic acid ester-, sulphone-, or sulphonic acid ester-group, wherein the at least one water-dispersed polymer P has functional groups selected from carboxylic acid groups, amino groups, and hydroxyl groups, and wherein the isocyanate-functional cross-linker C is a polyurethane polymer containing isocyanate groups having a number average molecular weight in a range of 2,000 to 15,000 g/mol, and wherein the composition comprises between 0.1 and 50 parts by weight of the isocyanate-functional cross-linker C per 100 parts by weight of the at least one water-dispersed polymer P.

2. The single-component sealant or adhesive composition according to claim 1, wherein the isocyanate-functional cross-linker C is an isocyanate-functional polymer with an isocyanate content of less than 10 wt.-%, based on the polymer, wherein the polymer is obtained from a polyether, polyester, polybutadiene, polycarbonate, or polyacrylate polyol and a polyisocyanate.

3. The single-component sealant or adhesive composition according to claim 2, wherein the polyisocyanate is an aliphatic polyisocyanate.

4. The single-component sealant or adhesive composition according to claim 1, wherein the at least one water-dispersed polymer P is selected from polyurethane polymers, poly(meth)acrylate polymers, styrene-(meth)acrylate copolymers, vinyl-acetate-ethylene copolymers, and vinyl-acetate-(meth)acrylate copolymers.

5. The single-component sealant or adhesive composition according to claim 1, wherein the amount of the at least one water-dispersed polymer P comprised in the composition is between 10 and 80 wt.-%, based on the total weight of the composition before drying in air during 7 days at 40° C.

6. The single-component sealant or adhesive composition according to claim 1, wherein the composition contains a base in an amount that renders the pH of the composition to between >7 and 10.

7. The single-component sealant or adhesive composition according to claim 6, wherein the base is a volatile amine compound.

8. The single-component sealant or adhesive composition according to claim 1, wherein the composition furthermore contains at least one additive selected from the list consisting of a thixotropy agent, a dispersant, a filler, a plasticizer, an emulgator, a pigment, and a biocide.

9. A method for sealing a joint between two substrates, the method comprising steps of:
   i) applying the single-component sealant composition according to claim 1 into the joint between two substrates,
   ii) exposing a wet layer of the single-component sealant composition in the filled joint to air until the wet layer is dry and/or cured.

10. A method for adhesively joining two substrates, the method comprising the steps of:
    i) applying the single-component adhesive composition according to claim 1 to a first substrate to form a wet layer of sealant on the first substrate, or applying the single-component adhesive according to claim 1 to a first substrate and to a second substrate to form a wet layer of adhesive on both substrates, ii) exposing the wet layer to air, iii) joining a second substrate to the first substrate such that the wet layer on the first substrate is in contact with the second substrate, or such that both wet layers on both substrates are in contact with each other, to effect bonding there between.

11. A dried and/or cured single-component sealant or adhesive composition according to claim 1.

12. The single-component sealant or adhesive composition according to claim 1, wherein the polyurethane polymer containing isocyanate groups is obtained from a reaction of at least one polyol with a superstoichiometric amount of at least one polyisocyanate.

13. The single-component sealant or adhesive composition according to claim 12, wherein the at least one polyol is a polyether polyol.

\* \* \* \* \*